United States Patent [19]

Huang

[11] Patent Number: 5,750,645
[45] Date of Patent: May 12, 1998

[54] PROCESS FOR THE PRODUCTION OF CALENDERED FILM OF POLYPROPYLENE RESIN

[75] Inventor: Hwang-Wen Huang, Taipei, Taiwan

[73] Assignee: Inteplast Corporation, Livingston, N.J.

[21] Appl. No.: 644,746

[22] Filed: May 10, 1996

[51] Int. Cl.[6] .................................................. B29C 43/24
[52] U.S. Cl. ................. 528/502 B; 528/481; 528/502 R; 528/502 F; 264/414; 264/447; 264/175; 264/211; 264/211.12; 264/288.8; 264/289.3; 264/290.2; 264/331.17; 264/345; 521/143; 521/144; 524/427; 524/583; 524/584; 525/240; 526/348.1; 523/348
[58] Field of Search ...................... 264/414, 447, 264/211, 211.12, 175, 288.8, 290.2, 345; 528/481, 502 R, 502 B, 502 F; 523/348; 526/348.1

[56] References Cited

U.S. PATENT DOCUMENTS

| | | |
|---|---|---|
| 3,765,999 | 10/1973 | Toyeda . |
| 3,790,435 | 2/1974 | Tanba et al. . |
| 4,318,950 | 3/1982 | Takashi et al. . |
| 5,233,924 | 8/1993 | Ohba et al. . |
| 5,439,628 | 8/1995 | Huang ................................... 264/175 |

*Primary Examiner*—Fred Teskin
*Attorney, Agent, or Firm*—Kenneth P. Glynn, Esq.

[57] ABSTRACT

A process which combines a calender with a stretching system and a set of heating rolls is provided in this invention to produce films of polypropylene resin of wide thickness range. The polypropylene films which have cavities distributed in the film and on the surfaces are suitable for writing or printing and have a low density. The films have surface qualities of each side of surface within $\pm 2 \times 10^{-6}$ inch of the average depth of the cavities, $\pm 2\%$ of the average of the gloss at 45° angle and $\pm 0.02$ of the average of coefficient of friction. Such a film is obtained by passing the molded film from the calender through a set of heating rolls at temperatures revealed in this invention before entering the stretching system. The obtained polypropylene film has superior printability, low density and high stiffness, and thus is suitable for use as a paper substitute.

7 Claims, 1 Drawing Sheet

PROCESS FOR THE PRODUCTION OF CALENDERED FILM OF POLYPROPYLENE RESIN

BACKGROUND OF THE INVENTION

1. Field of the Invention

The present invention relates to a calendering process to produce an opaque, writable and printable synthetic film of polypropylene resin which has cavities distributed in the film and on the surface of the film and has a wide thickness range. More particularly, it relates to a calendering process which combines a calender with a stretching system and a set of heating rolls to produce a synthetic film of polypropylene resin which has almost the same surface qualities on both sides of the film. The present invention yields to a writable, printable and opaque synthetic film of polypropylene resin and thus which has almost the same surface qualities on both surfaces of the film.

2. Information Disclosure Statement

Wood pulp has become increasingly scarce and the cost of harvesting trees for pulp has likewise increased in recent years. In addition, the manufacturing of pulp and paper requires very large quantities of water, resulting in severe effluent problems. Effluent water often contains organic materials such as lignin residues, wood sugar, phenolic materials, etc., which can be toxic to aquatic life, and cause excessive biological oxygen demand, thus resulting in serious ecological damage to waterways, lakes and oceans. In addition, pulp and paper mills also contribute severely to air pollution. The addition of pollution and effluent control devices to the mill would be economically prohibitive and result in substantial increases in the cost of making paper. This continuing scarcity of wood pulp and the pollution problem of pulp and paper manufacturing have prompted the search for paper substitute based on synthetic resins. Polypropylene (hereinafter referred to as "PP") resin which has a low density and high stiffness is widely used in this application.

In the prior art, such as U.S. Pat. No. 3,765,999, No. 4,318,950, No. 3,790,435 and U.S. Pat. No. 5,233,924, the general practice to manufacture a PP film which is used as a substitute for paper, has been to extrude the PP resin filled with inorganic filler into film form with a T-die at a temperature ranging between 200° and 250° C. The PP film is then cooled by a chilling roll at a temperature between 25° and 400° C. and then uniaxially or biaxially stretched at 120°–185° C. The stretching generates fractures at the interfaces between the inorganic fillers and the PP resin to produce cavities inside the film. The cavities in the film improve the receptivity to writing of the synthetic paper since the polyolefin resins, such as polyethylene, polypropylene, polybutene, etc., are hydrophobic and non-polar, resulting in poor or inadequate receptivity to common writing and printing materials such as inks, pencils, paint and the like. The previously described extrusion process, however, generally produces PP film of thickness less than 80 μm in order to accommodate the limitation of mechanical structure and to obtain good thickness distribution.

The calendering process can produce film of a wide range of thicknesses as well as good thickness distribution. U.S. Pat. No. 5,439,628 discloses a calendering process to manufacture PP film containing high level of inorganic fillers. However, the calendering process can only stretch the film at a temperature above the melting temperature of PP. As a result, the obtained film does not contain cavities which reduce the density and improve the receptivity to common writing and printing materials of the PP film. In addition, the film made of this process has different surface qualities on each of the two sides of the film. The two surface temperatures of a film obtained from a calender are very different. The surface which contacts the calendering roll has a temperature about 30° C. higher than that of the other surface which is exposed to the air. Therefore, when the film is cooled, different surface qualities occur because of different cooling rate of the two sides of the film.

In order to overcome the aforesaid shortcomings of the prior art, a calendering process which combines a calender with a stretching system and a set of heating rolls is developed in this invention to manufacture writable PP film which has cavities distributed on the surfaces of and inside the film. In addition, the present invention process produces PP film of wide thickness range and eliminates the different surface quality problem of the prior art.

SUMMARY OF THE INVENTION

The present invention provides an improved calendering process to produce a writable and printable synthetic film of polypropylene resin which has cavities distributed in the film and on the surfaces of the film. In addition, the film produced from the present invention process of this invention has almost the same surface qualities on both sides of the film, which eliminates the problem of different surface qualities encountered in the prior art.

The film contains from 100 parts by weight (hereinafter referred to as PBW) of polypropylene resin, 0–70 parts by weight of polyethylene resin, 20–200 parts by weight of inorganic fillers and 0.5–10 parts by weight of non-ionic antistatics. Other additives such as heat stabilizers, lubricants, antioxidants, colorants and other known additives may be included in the composition without departing from the scope of this invention.

The composition above is initially mixed in a mixing system which contains a series of mixing steps and then transferred to a calender to form film or sheet. The film is then removed from the calender and passes a set of heating rolls, which contains 5–12 hollow heating rolls, and then enters a stretching system to be uniaxially or biaxially stretched.

BRIEF DESCRIPTION OF THE DRAWINGS

The features of the present invention, which are believed to be novel, are set forth with particularity in the appended claims. The invention may best be understood by reference to the following description taken in conjunction with accompanying drawings, wherein like reference numerals identify like elements, and wherein:

DETAILED DESCRIPTION OF THE PRESENT INVENTION

Figure 1:
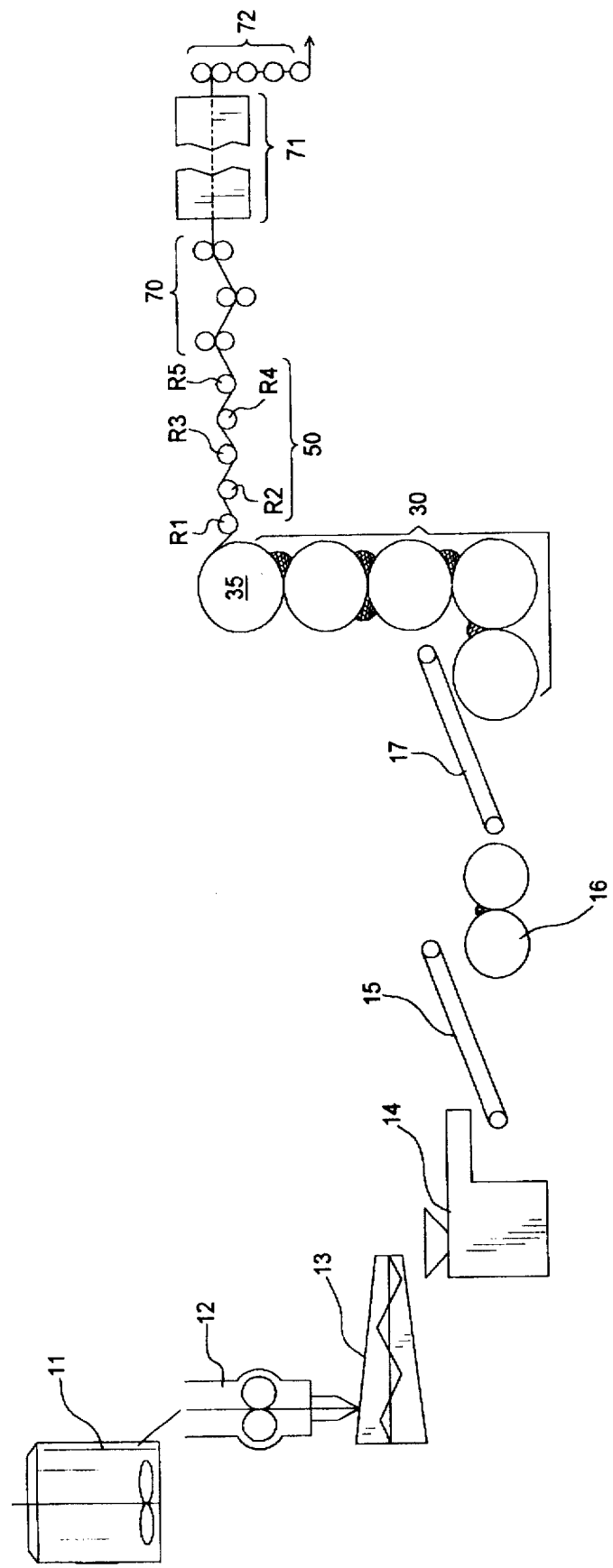
FIG. 1 is a schematic drawing of the improved calendering process, which contains a feeding system, a 5-roll calender of inverted "L" configuration, a set of five heating rolls and a stretching system, used in this invention.

The composition of the synthetic film of the present invention process comprises: (1) 100 parts by weight of polypropylene, (2) 0 to about 70 parts by weight of polyethylene, (3) from about 20 about 200 parts by weight of inorganic fillers and (4) from 0.5 to about 10 parts by weight of antistatic agents, as well as other additives such as stabilizers, lubricants, antioxidants, colorants, other known additives and inert fillers.

The polypropylene resin which can be used in this invention includes homopolymer PP, random or blocked copolymer of propylene and ethylene, or blends of homopolymer PP and copolymer of propylene and ethylene. The PP resin will have a melt flow rate (hereinafter referred to as MFR) measure at 230° C. and 2.16 Kg load (ASTM D-1238) of about 0.1 to 10 g/10 min., and this will preferably be between about 0.3 and 3.0 g/10 min.

The polyethylene resin which may be used in this invention can be a high density polyethylene (hereinafter referred to as HDPE), a linear low density polyethylene (hereinafter referred to as LLDPE), a low density polyethylene (hereinafter referred to as LDPE) or blends of the previously mentioned polyethylene resins. The polyethylene resin is used on the basis of 0 to 70 parts by weight, based on 100 parts by weight of polypropylene, and when used is preferably about 20 to about 50 parts by weight. The HDPE has a density ranging from 0.940 to 0.970 g/cm$^3$ and has a melt index (hereinafter referred to as MI) measured at 190° C. and a load of 2.16 Kg (ASTM D1238) below 50 g/10 min., preferably between 0.3 and 30 g/10 min. The LLDPE has a density within the range between 0.88 and 0.94 g/cm$^3$ and an MI which is between 0.1 and 30 g/10 min., preferably between about 0.5 and 10 g/cm$^3$. The density of the LDPE which can be used in this invention ranges from 0.910 to 0.925 g/cm$^3$ while the preferred MI of the LDPE is from about 0.1 to 50 g/cm$^3$.

The synthetic film of the present invention process contains from 20 to about 200 PBW and preferably from about 100 to about 200 PBW of particles of a fine inorganic fillers as listed hereinafter. Care must be taken in selecting the filler so that it does not discolor due to decomposition at elevated temperatures which are applied in the course of making the synthetic paper according to the invention. Examples of suitable inorganic fillers for the films of this invention are: treated or untreated grades of clay, talc, gypsum, calcium carbonate, magnesium oxide, titanium dioxide, diatomaceous earth and silicon oxide particles used either singly or as a mixture of two or more of these fillers. Calcium carbonate is usually preferred in the production because of the low price of the mineral. The suitable filler has a mean particle size ranging between 0.1 and 15 μm, preferably to be between 1 and 4 pm.

The antistatic agents used in the composition of this invention should be non-ionic antistatics. Cationic and anionic antistatics are not suitable for this application since their poor heat stability at the process temperature of this invention. Out of the wide range of non-ionic antistatics which may be used for preparing the calendered film according to this invention, the following ones may be cited by way of illustrative, but not limited, for example: polyethylene glycol esters, polyethylene glycol ethers, fatty acid esters, ethanol amides, monoglycerides, diglycerides and ethoxylated fatty amines.

According to the desired use of the synthetic paper of the present invention, heat stabilizers, plasticizers, lubricants, ultraviolet light stabilizers, colorants and other additives may be incorporated in the above composition that are used in the present invention.

The improved calendering process used in this invention comprises a mixing and feeding system, a calender, a set of heating rolls and a stretching system. FIG. 1 illustrates the calendering process which produces the synthetic PP film containing cavities inside and on the surfaces of this invention.

Referring to FIG. 1, the mixing and feeding system consists of a mixer (11), a kneader (12), a feeder (13), an extruder (14), a stationary conveyor (15), a two-roll mill (16) and a swivel conveyor (17). Since continuous mixing has the disadvantages of generating lower dispersive mixing quality and possessing less flexibility in switching to new compositions, this mixing system is provided to have good mixing, which has a great positive effect on the quality of the product.

The mixer (11) is a high intensity/high shear mixer which completely mixes the resins and the additives. The kneader (12) kneads the mixture from the mixer to further enhance the mixing of the resins and the additives. The temperature of the kneader is preferred to be maintained at a temperature between 170° and 210° C. The mixture is then transferred via the feeder (13) to the extruder (14), which has a single screw, dual screws or planetary screw. The extruder (14) extrudes the mixture from the feeder (13) into strip form. The extruder (14) also works as strainer to filter out contaminants from the thermoplastic material in order to avoid damage to the calendering rolls by the contaminants. The two-roll mill (16) is used to further enhance the mixing and acts as a buffer between the extruder (14) and the calender (30). The two-roll mill (16) consists of two hollow rolls of diameter ranging between 500 mm and 700 mm. The temperatures of the hollow rolls are maintained between 170° and 230° C. by pressured hot water, pressured steam or hot oil. The stationary conveyor (15) and the swivel conveyor (17) are used to move the extrudate from the extruder (14) to the two-roll mill (16) and to transfer the well mixed thermoplastic material to the calender (30), respectively. Equivalent means for movement could be used in place of these conveyors, as may be desired.

The calenders employed for the manufacture of thermoplastic films and sheets are suitable for this process. Suitable calenders include, but are not limited to, 4-roll, 5-roll and 6-roll calendering equipment having various configurations, such as stacked "L", inverted "L", "Z", and inclined "Z". A calender having high thermal conductive guiding plates and straight contour on #4 and #5 rolls is preferred for operation temperatures up to 250° C. The calendering rolls calender the mixture from the mixing and feeding system to form film.

The film is then removed from the last calendering roll and passes a set of five heating rolls (50) at temperatures which would be discussed in the later section. The film can be stretched between the last calendering roll and the first heating roll at a temperature above the melting temperature of the PP resin. The drawing ratio which is the speed of the first heating roll to that of the last calendering roll ranges from 1 to 3. Instead of the regular chrome plated or rubber coated heating rolls, teflon and/or silicone rubber coated heating rolls (50) with diameters from about 80 to 200 mm are preferably used to facilitate the film production. After passing the five heating rolls, the film is cooled to a temperature below the melting point of the PP resin.

The film is then drawn or stretched along two orthogonal axes. The film is first drawn along its longitudinal axis by a longitudinal stretching unit (70). The drawing unit (70) consists of three to six rolls of diameter ranging between 80 and 200 mm. The temperature variations of the rolls are controlled to be within ±1° C. The longitudinal drawing unit (70) draws the material in longitudinal direction at a drawing ratio from 1 to 6. The longitudinally stretched film later enters a laterally drawing unit (71) which stretches the film laterally at a drawing ratio up to 4 and preferably between 1 and 2. The laterally drawing unit (71) contains hundreds of clips and a oven which maintains the temperatures of the zones in the oven to be within ±2° C. The film is snapped by the clips and is stretched in the oven at constant temperature in order to maintain uniform thickness distribution across the film.

Although it is preferable that the sheet be first drawn or stretched along its longitudinal axis and then drawn or stretched along a lateral axis, it may also be drawn or stretched in the reversed sequence or in a simultaneous step along the longitudinal and lateral axes.

A drawing or stretching factor in either of the longitudinal and lateral directions of more than once the length is desirable. More precisely, when the drawing or stretching factor is expressed in terms of area-multiplication factor, which is the multiplication of the stretching factors of the longitudinal and lateral directions, a value falling within a range of from 1.5 to 50 times is preferable. Thus, with a suitable value selected for the drawing or stretching factor depending on the thickness of the non-oriented sheet, the thickness of the resultant product can be adjusted in a desired range.

After the drawing unit, for thinner film, the film can be further longitudinally drawn in a drawing and tempering unit (72) which longitudinally draws and tempers the film. This unit contains 3–10 hollow rolls of diameters ranging from 150 to 200 mm. Water or oil is circulated inside the hollow rolls to maintain the temperature within ±1° C. of the set temperature. The drawing ratio which can be obtained in a drawing and tempering unit (72) is up to 3.

The film is then cooled by chill rolls, surface treated by surface treatment devices and wound by a winder. The surface treatment includes corona treatment to further improve the printability of the polyolefin surface, devices to remove inorganic filler exposed to the surface of the film which would affect the printing quality of the printer and coating facilities to coat additives which improve the printability and shorten the period of drying time of the ink.

In order to produce films of almost the same surface qualities, the film removed from the calender has to pass a set of teflon and/or silicone rubber coated heating rolls (50) located between the calender and the stretching system before entering the stretching system. Referring to FIG. 1, the last calendering roll (35) has a temperature, $T_R$, which ranges between 170° and 230° C. The heating rolls in accordance with the passage of the film are designated as the first heating roll (hereinafter referred to as "R1"), the second heating roll (hereinafter referred to as "R2"), the third heating roll (hereinafter referred to as "R3"), the fourth heating roll (hereinafter referred to as "R4") and the fifth heating roll (hereinafter referred to as "R5"). The temperatures of R1, R2, R3, R4 and R5 are $TK_1$, $TK_2$, $TK_3$, $TK_4$ and $TK_5$, respectively. The temperature of the last calendering roll, $T_R$, is generally higher than the melting temperature of the PP resin and the temperature of R1 which corresponds to $TK_1$. $TK_2$, which is generally set at the same temperature as $TK_3$ and is at least above 100° C., is generally lower than $TK_1$. In order to achieve the same surface qualities of the two sides of the film, the temperature, $T_R$, of the last calendering roll (35) and the heating rolls, R1, R2, R3, R4 and R5, should satisfy the following two expressions:

$$0.3\,(T_R-TK_2) > (TK_1-TK_2) > 0.1(T_R-TK_2) \quad (I)$$

and $$TK_2=TK_3>TK_4=TK_5>100°\ C. \quad (II)$$

wherein all of the TKs are as defined above.

Though the present invention has been described with five heating rolls, more heating rolls or embossing rolls may be added between R5 and stretching system to enhance the temperature controls or to change the surface texture of the film before the film entering the stretching unit. Such modifications and variations are also considered to be within the purview and scope of the appended claims.

The PP film produced by this invention has a wide thickness range which ranges between 0.03 and 2.0 mm and preferably to be from 0.06 to 0.8 mm. The density of the film (as measured by ASTM D-1505) is below 1.15 g/cm$^3$ and preferably is between 0.4 and 1.0 g/cm$^3$. The luminous transmittance (as measured by ASTM D-1003) and whiteness index (as measured by ASTM E-313) of the film are less than 30% and above 85, respectively, without the addition of hiding pigment such as titanium dioxide. The luminous transmittance can be further reduced to be below 20% and the whiteness index can be further increased to be above 90 when titanium dioxide is added. The average gloss of the film (as measured by ASTM D-2457 at 45° angle), which is the average of the gloss values of both the machine and transverse directions of both sides of the film, ranges between 5 and 15% and the gloss of each side of the film is within ±2% of the average gloss value and preferably within ±1%. The average static coefficient of friction (hereinafter referred to as COF) of the film (as measured by ASTM D-1894), which is the average COF of both the machine and transverse directions of both sides of the film, ranges between 0.2 and 0.5 and the COF of each side of the film is within 0.02 of the average COF value. The depths of the cavities ( as measured by a surface roughness tester, Mitutoyo Surftest 212) on the two surfaces of film are also within ±2×10$^{-6}$ inch of the average cavity depth.

EXAMPLES

The present invention will now be explained by the following examples. The following examples are illustrative of the present invention and are not included as a limitation of the scope thereof:

Example 1

1. Composition:

| | |
|---|---|
| Homopolymer PP (MFR = 1.0) | 100 PBW |
| Low density polyethylene (MI = 10) | 30 PBW |
| Calcium carbonate | 100 PBW |
| Ester wax | 1 PBW |

2. Process:

The above composition is mixed in the mixer(11), kneaded at 195° C. in the kneader (12), extruded by the extruder (14), milled at 190° C. in the two roll mill (16), and calendered into film between calendering rolls having temperatures which ranges between 210° and 235° C. The unstretched film is then removed from the calendering roll by take-off rolls (50) and stretched in the stretching system with an area multiplication factor of 7. The temperatures of the last calendering roll and the five take-off rolls are set at 220°, 145°, 123°, 123°, 112° and 112° C., respectively.

3. Properties of the Film:

Films obtained from the above composition and after the treatment of the previous calendering process have the following properties:
Thickness (mm): 0.12
Density (g/cm$^3$): 0.85
Elongation (%): 40 (MD); 80 (TD)
Illuminous Transmittance (%): 22
Whiteness: 88

Average of Gloss at 45° Angle (%): 9.93±0.75
Average of COF: 0.407±0.01
Average Depth of the Cavities ($10^{-6}$ inch): 49.8 ±0.2

Example 2

1. Composition:

| | |
|---|---|
| Homopolymer PP (MFR = 1.0) | 100 PBW |
| High density polyethylene (MI = 4) | 40 PBW |
| Calcium carbonate | 100 PBW |
| Ester wax | 1.2 PBW |
| Titanium dioxide | 10 PBW |

2. Process:

The process is similar to the treatment set forth in Example 1 except that the temperature of the kneader is 190° C., the temperature of the two-roll mill is 185° C., the temperatures of the last calendering roll and the five take-off rolls are 219°, 140°, 125°, 125°, 110° and 110° C., respectively, and the area multiplication factor is 5.

3. Properties of the Film:

Films obtained from the above composition and after the treatment of the previous process have the following properties:
Thickness (mm): 0.15
Density (g/cm$^3$): 1.0
Elongation (%): 40 (MD); 100 (TD)
Illuminous Transmittance (%): 14
Whiteness: 91
Average of Gloss at 45° Angle (%) 9.74±0.60
Average of COF: 0.401±0.01
Average Depth of the Cavities ($10^{-6}$ inch) 47.2±0.6

Obviously, numerous modifications and variations of the present invention are possible in light of the above teachings. It is therefore understood that within the scope of the appended claims, the invention may be practiced other than as specifically described herein.

What is claimed is:

1. A process for manufacturing of polypropylene films which have cavities inside and on the surfaces of the film and have substantially the same surface qualities on both surfaces of the film, comprising the steps of:

(a) formulating a composition having at least the following constituents:

(1) 100 parts by weight of polypropylene of melt flow rate which is measured at 230° C. and 2.16 Kg ranging between about 0.1 and about 10 g/10 min;
   (2) from 0 to about 70 parts by weight of polyethylene;
   (3) from about 20 to about 200 parts by weight of inorganic fillers; and,
   (4) from 0.5 to about 10 parts by weight of antistatic agent;

(b) mixing said composition through a sequence of steps as follows:

(1) shear mixing with a high intensity/high shear mixer having at least one rotor;
   (2) kneading with a kneader maintained at a temperature between 170° C. and 210° C.;
   (3) extruding with an extruder so as to mix and to filter out contaminants; and,
   (4) milling with a two-roll mill to be used as a buffer and to enhance mixing;

(c) calendering said composition into a film using a calendering unit having a plurality of rolls;
   (d) heating said film by passing said film from said calendering unit by a set of at least five heating rolls;
   (e) stretching said film in both its longitudinal and lateral directions, in a drawing ratio of at least 1 to about 6;
   (f) cooling said film to ambient temperature; and,
   (g) treating the surfaces of said film with coating and corona treatment, wherein the last calendering roll and said at least five heating rolls have temperatures, which are $T_r$, $TK_1$, $TK_2$, $TK_3$, $TK_4$ and $TK_5$ for said last calendering roll and the first five heating rolls, respectively, satisfy the following two expressions:

$$0.3(T_r-TK_2) > (TK_1-TK_2) > 0.1(T_r-TK_2) \quad (I)$$

and $$TK_2=TK_3>TK_4=TK_5 \geq 100° \text{ C.} \quad (II)$$

2. The process of claim 1 wherein said heating step utilizes five heating rolls.

3. The process of claim 1 wherein said polypropylene is selected from the group consisting of polypropylene homopolymers, copolymers of propylene and ethylene, and mixtures thereof.

4. The process of claim 1 wherein said polyethylene is selected from the group consisting of high density polyethylene, linear low density polyethylene, low density polyethylene, and mixtures thereof.

5. The process of claim 1 wherein said antistatic agent is a non-ionic antistatic agent.

6. The process of claim 1 wherein said milling with a two-roll mill is performed between 170° C. and 230° C.

7. The process of claim 1 wherein said polyethylene is used in an amount from about 20 to about 50 parts by weight.

* * * * *